2,844,614
BIS(FLUOROETHYL) MERCURIALS AND METHOD OF PRODUCING THEM

Carl G. Krespan, Wilmington, Del., assignor to E. I. du Pont de Nemours and Company, Wilmington, Del., a corporation of Delaware No Drawing. Application January 7, 1957
Serial No. 632,679

5 Claims. (Cl. 260—431)

This invention relates to a new method of preparing organometallic compounds. More particularly, it relates to a new method of preparing fluoroorganomercury compounds and to certain new fluoroorganomercury compounds obtainable by this method.

Fluorocarbon mercurials such as bis(trifluoromethyl)-mercury and bis(pentafluoroethyl)mercury have been reported in the literature (J. H. Simons, "Fluorine Chemistry," vol. II, chapter 5, by H. J. Emeleus, pp. 321–323). These compounds are valuable initiators for the polymerization of unsaturated compounds such as ethylene and tetrafluoroethylene. However, their synthesis is difficult and the described method is applicable only to the preparation of bis(perfluoroalkyl)mercurials.

It is an object of this invention to prepare fluoroalkyl mercurials in a simple manner, from readily available fluoroolefins. It is a further object to prepare fluoroalkylmercurials which can also contain hydrogen or halogen other than fluorine. Still a further object is to produce fluoroalkyl mercurials which are useful as initiators for the polymerization of unsaturated compounds. These and other objects will become apparent from the following disclosure.

This invention is directed to a novel process of preparing bis(fluoroalkyl)mercurials having the formula $Hg(CXY—CF_3)_2$, where X and Y are hydrogen or halogen, by bringing in contact at a temperature above 25° C. and until the bis-(fluoroalkyl)mercurial has formed, mercuric fluoride with a fluoroolefin of the formula $CXY=CF_2$, where X and Y are hydrogen or halogen. The invention also comprises as new products the bis-(fluoroalkyl)mercurials of the formula $Hg(CXY—CF_3)_2$ where X and Y are hydrogen or halogen and at most one of X and Y is fluorine.

The reaction may be represented by the equation $$HgF_2 + 2CXY=CF_2 \rightarrow Hg(CXY—CF_3)_2$$

Nuclear magnetic resonance spectral analysis indicates that the products have the structure given above, that is, the fluorine atoms of mercuric fluoride attach themselves to the difluoromethylene groups.

Any fluoroolefin of the formula $CXY=CF_2$, where X and Y are hydrogen or halogen, is suitable for use in the process of this invention. Examples of such fluoroolefins are vinylidene fluoride, trifluoroethylene, 1,1-difluoro-2-chloroethylene, 1,1-difluoro-2-bromomethylene, 1,1-difluoro-2-iodoethylene, tetrafluoroethylene, chlorotrifluoroethylene, bromotrifluoroethylene, 1,1-difluoro-2,2-dichloroethylene, 1,1-difluoro-2,2-dibromoethylene, etc. The most accessible and preferred of these 1,1-difluoroolefins are those in which the atoms attached to the 2-carbon are hydrogen or a halogen of atomic number 9 to 17, i. e., fluorine or chlorine.

The mercuric fluoride is preferably used as the preformed, anhydrous salt. However, it can also be made in situ by starting with a solution of mercuric oxide in concentrated (50% or stronger) aqueous hydrofluoric acid. In such a solution, mercuric fluoride is present as the dihydrate.

The relative proportions of the two reactants are not critical but it is preferred to use at least two moles of the fluoroolefin per mole of mercuric fluoride, and desirably a slight to moderate excess thereover, e. g., 10–100%.

The reaction can be carried out without the aid of a solvent or diluent, for example by heating a mixture of dry mercuric fluoride and difluoroolefin in a sealed vessel. However, better results are obtained by using as the reaction medium a liquid which dissolves mercuric fluoride to the extent of at least 5% at 25° C., and which is substantially inert chemically towards the reactants and reaction product. Fluorine-containing liquids boiling above about 20° C. and which have the already mentioned solvent power for mercuric fluoride are particularly suitable. Among these may be mentioned concentrated (above 50%) aqueous hydrofluoric acid, or for use under anhydrous conditions, arsenic trifluoride, antimony pentafluoride and the aliphatically saturated fluorocarbons (i. e., compounds containing only carbon and fluorine), such as perfluoroethylcyclopentane, perfluoro-n-octane, perfluoro-n-decane, and the like. The highest conversions have been obtained in arsenic trifluoride, which is therefore the preferred reaction medium.

The reaction temperature can be varied within wide limits. The more reactive 1,1-difluoroolefins, e. g., vinylidene fluoride or trifluoroethylene, react at temperatures as low as 25° C. With less reactive fluoroolefins it is desirable to work at higher temperatures, e. g., 100° C., in order to achieve substantial conversions within practical reaction times. The temperature can be as high as the decomposition point of reactants or reaction products, but in practice it is unnecessary to exceed about 200° C., the most useful temperature range being 50–150° C. Under such conditions, substantial conversions are normally obtained within one to eight hours. A preferred mode of operation consists in preheating a mixture of mercuric fluoride and arsenic trifluoride at 50–150° C. for about one hour, then injecting the fluoroolefin into the reaction vessel and continuing the heating for a few additional hours.

Since most of the fluoroolefins suitable for use in this process are gases or low boiling liquids, the reaction is normally conducted in sealed vessels at the autogenous pressure developed by the reactants at the operating temperature.

In addition to the bis(fluoroethyl)mercurial, there is sometimes obtained as by-product a variable amount of the polymer of the fluoroolefin employed. This polymerization is observed in particular when tetrafluoroethylene is employed. If polymerization of tetrafluoroethylene rather than formation of the monomeric mercurial is desired, it is recommended to use the mercuric fluoride in catalytic amounts only. Under such conditions, a 90% conversion to polytetrafluoroethylene can be obtained at 150° C. The polymer contains some bound mercury. Reaction of a larger, but not equivalent, amount of mercuric fluoride with a mixture of tetrafluoroethylene and hexafluoropropene has given about 60% conversions to a fluorocarbon polymer that was a mixture of high-boiling oil, grease-like polymer and solid polymer. A similar copolymerization of tetrafluoroethylene, hexafluoropropene and perfluoroheptene-1 gave a viscous fluorocarbon oil boiling as high as 270° C. at 0.2 mm., along with a grease-like polymer and a solid polymer.

The bis(fluoroethyl)mercury compounds obtainable by the process of this invention are white, sublimable, crystalline solids stable under ordinary conditions. They can be isolated from the reaction mixture without difficulty by removing the unreacted fluoroolefin and the solvent, if a solvent was used, under reduced pressure, then sublimating the mercurial out of the unreacted mercuric fluoride and of any other non-volatile material present.

The invention is illustrated in greater detail by the following examples.

*Example 1*

A mixture of 12 g. (0.05 mole) of anhydrous mercuric fluoride and 15 cc. of arsenic trifluoride was heated to 150° C. in an agitated pressure vessel (about 80 cc.) and 20 g. (0.2 mole) of tetrafluoroethylene was injected into the vessel. During a period of 50 minutes at 150° C. the pressure inside the vessel dropped from its initial value of 1050 p. s. i. to 275 p. s. i. Heating was continued for six hours more, after which substantially no gas remained in the vessel. After removal of the arsenic trifluoride from the reaction product under reduced pressure, the residual solid was heated at 95° C. at atmospheric pressure, which gave 4.1 g. of a white crystalline sublimate, M. P. 96–98° C. of bis-(pentafluoroethyl) mercury, $Hg(CF_2-CF_3)_2$.

*Analysis.*—Calc'd for $C_4F_{10}Hg$: Hg, 45.83; F, 43.31. Found: Hg, 44.22; F, 41.67.

This product was further identified by treating it with aqueous sodium stannite, which caused evolution of two moles of pentafluoroethane, identified by infrared analysis.

The non-volatile reaction product contained 15.5 g. of polytetrafluoroethylene, identified by its physical properties and its X-ray diffraction pattern.

*Example 2*

A mixture of 95.6 g. (0.4 mole) of mercuric fluoride, 90.1 g. (0.9 mole) of tetrafluoroethylene and 60 cc. of arsenic trifluoride was heated in an agitated pressure vessel (about 400 cc.) at 100° C. for 14 hours. There was obtained from the reaction product by sublimation at 80° C. at atmospheric pressure 98 g. of bis(pentafluoroethyl)mercury, corresponding to a 56% conversion based on the mercuric fluoride.

*Example 3*

In this example, mercuric fluoride was prepared in situ from a mixture of 21.7 g. (0.10 mole) of mercuric oxide and 15 cc. (0.43 mole) of 50% aqueous hydrofluoric acid. This mixture was heated in an agitated pressure vessel at 100° C. for 5 hours with 30.4 g. (0.3 mole) of tetrafluoroethylene, under the autogenous pressure of the reactants. The mixed solid and liquid reaction product was heated at 80° C. under 1 mm. pressure and the volatile material was condensed in a trap at −78° C. The contents of the trap were warmed and filtered and the solid material was sublimed at 85° C. at atmospheric pressure. There was thus obtained 2.4 g. of bis(pentafluoroethyl)mercury, identified by its physical properties and by comparison of its nuclear magnetic resonance spectrum with that of an authentic sample. There was also obtained as a reaction product 29.4 g. of polytetrafluoroethylene.

*Example 4*

A mixture of 12 g. (0.05 mole) of mercuric fluoride, 11.6 g. (0.12 mole) of tetrafluoroethylene and 20 cc. of perfluorodimethylcyclohexane was heated with shaking at 150° C. for 4 hours under the autogenous pressure of the reactants. There was obtained, in a lower conversion than in the preceding example, a solid reaction product from which bis(pentafluoroethyl)mercury was isolated by sublimation. The residue was polytetrafluoroethylene.

*Example 5*

A mixture of 23.9 g. (0.1 mole) of mercuric fluoride, 25 g. (0.3 mole) of trifluoroethylene and 15 cc. of arsenic trifluoride was heated at 50° C. for 4 hours with agitation under the autogenous pressure of the reactants. The reaction product, which was a homogeneous liquid, was evaporated under reduced pressure to remove the arsenic trifluoride, and the residual crystalline solid was heated at 70–90° C. under atmospheric pressure. There was obtained 26.6 g. of a white crystalline sublimate of bis(1,2,2,2 - tetrafluoroethyl)mercury, $Hg(CHF-CF_3)_2$. M. P. 78–79° C., corresponding to a 66% conversion based on the mercuric fluoride.

*Analysis.*—Calc'd for $C_4H_2F_8Hg$: C, 11.93; F, 37.75; Hg, 49.82. Found: C, 12.14; F, 36.91; Hg, 49.20.

The identity and structure of the product was further established by its nuclear magnetic resonance spectrum.

*Example 6*

In this example, no solvent or diluent was used. A mixture of 23.9 g. (0.1 mole) of anhydrous mercuric fluoride and 25 g. (0.3 mole) of trifluoroethylene was heated with agitation at 150° C. for 4 hours in a pressure vessel. On sublimation of the solid reaction product at 75–85° C. at atmospheric pressure, bis(1,2,2,2-tetrafluoroethyl)mercury was collected, M. P. 75–77° C. Its mixed melting point with an authentic sample showed no depression.

*Example 7*

A mixture of 23.9 g. (0.1 mole) of mercuric fluoride, 35 g. (0.3 mole) of chlorotrifluoroethylene and 15 cc. of arsenic trifluoride was heated with agitation at 100° C. for 7 hours under autogenous pressure. Arsenic trifluoride was removed from the reaction product by evaporation at reduced pressure and the solid residue was heated in a sublimation apparatus at 85° C. at atmospheric pressure. There was obtained 14.6 g. of white crystalline sublimate, M. P. 94–95° C., of bis(1-chloro-1,2,2,2-tetrafluoroethyl)mercury,

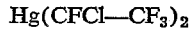

$$Hg(CFCl-CF_3)_2$$

*Analysis.*—Calc'd for $C_4Cl_2F_8Hg$: C, 10.20; Cl, 15.00; F, 32.20; Hg, 42.60. Found: C, 9.57; Cl, 13.65; F, 33.28; Hg, 41.32.

The structure of this product was established by its nuclear magnetic resonance spectrum.

There was also obtained as a by-product 1.5 g. of polymerized chlorotrifluoroethylene.

*Example 8*

A mixture of 23.9 g. (0.1 mole) of mercuric fluoride, 19 g. (0.3 mole) of vinylidene fluoride and 15 cc. of arsenic trifluoride was heated to 100° C. in a pressure vessel and held at that temperature with agitation for 7 hours. After removing the arsenic trifluoride under reduced pressure from the reaction product, the residue was heated at 85° C. at atmospheric pressure in a sublimation apparatus. There was obtained 24.2 g. (66% conversion based on the mercuric fluoride) of a white crystalline sublimate, M. P. 40° C., of bis(2,2,2-trifluoroethyl)mercury, $Hg(CH_2-CF_3)_2$.

*Analysis.*—Calc'd for $C_4H_4F_6Hg$: C, 13.10; F, 31.09; Hg, 54.7. Found: C, 13.04; F, 29.81; Hg, 54.27.

The structure of the product was established by its nuclear magnetic resonance spectrum.

The new products of this invention are the bis(fluoroethyl) mercurials having the formula $Hg(CXY-CF_3)$, where X and Y are hydrogen or halogen and at most one of X and Y is fluorine. Among these products may be mentioned, in addition to those described in the examples, bis(1 - chloro - 2,2,2 - trifluoroethyl)mercury, bis(1-bromo - 2,2,2 - trifluoroethyl)mercury, bis(1-iodo-2,2,2-trifluoroethyl)mercury, bis(1,1-dichloro - 2,2,2 - trifluoroethyl)mercury, bis(1,1-dibromo - 2,2,2 - trifluoroethyl)mercury, and the like. The most accessible and preferred products are those having the above formula in which X and Y are hydrogen or halogen of atomic weight 9 to 17, i. e., fluorine or chlorine, and at most one of X and Y is fluorine.

As already noted, the bis(fluoroalkyl)mercury compounds obtainable by the process of this invention are useful as initiators for the polymerization of unsaturated compounds. They are also useful in chemical synthesis as fluoroalkylating agents capable of introducing the $CF_3$—CXY-group into a variety of molecules. For example, the bis(fluoroalkyl)mercurials react with magnesium amalgam in absolute diethyl ether to form a bis(fluoroalkyl)magnesium which reacts in the same manner as Grignard reagent. Treatment of such an organometallic, having the structure $(CF_3—CXY)_2Mg$, with, for example, an ethyl ester of a carboxylic acid, RCOOEt, leads to a fluoroketone of the type $CF_3CXY$—CO—R. Another instance of the versatility of the bis(fluoroalkyl)mercurials is their reaction with sulfur, whereby a bis(fluoroalkyl)disulfide is obtained. For example, on heating 6.4 g. of sulfur with 21.9 g. of bis(pentafluoroethyl)mercury at 250° C. for 8 hours, there is obtained bis(pentafluoroethyl)disulfide, $CF_3CF_2$—S—S—$CF_2CF_3$ as a light yellow liquid boiling at 65–68° C.

I claim:

1. A method for preparing bis(fluoroethyl)mercurials which comprises reacting mercuric fluoride with a fluoroolefin of the formula $CXY=CF_2$ wherein X and Y are selected from the group consisting of hydrogen and halogen.

2. A method for preparing bis(fluoroethyl)mercurials which comprises reacting mercuric fluoride with a fluoroolefin of the formula $CXY=CF_2$ wherein X and Y are selected from the group consisting of hydrogen and halogen in the presence of an inert reaction medium which dissolves the mercuric fluoride to the extent of at least 5% at 25° C.

3. Compounds of the formula $Hg(CXY—CF_3)_2$ wherein X and Y are selected from the group consisting of hydrogen and halogen with the proviso that at least one of the two is other than fluorine.

4. A method for preparing bis(fluoroethyl)mercurials which comprises reacting mercuric fluoride with a fluoroolefin of the formula $CXY=CF_2$ wherein X and Y are selected from the group consisting of hydrogen and halogen in the presence of arsenic trifluoride.

5. A method for preparing bis(fluoroethyl)mercurials which comprises reacting a fluoroolefin of the formula $CXY=CF_2$ wherein X and Y are selected from the group consisting of hydrogen and halogen with the product resulting from the admixture of mercuric oxide and concentrated aqueous hydrofluoric acid.

No references cited.